A. W. BOWLING.
Thrashing Machine.

No. 530.

2 Sheets—Sheet 1.

Patented Dec. 26, 1837.

A. W. BOWLING.
Thrashing Machine.
No. 530.
2 Sheets—Sheet 2.
Patented Dec. 26, 1837.
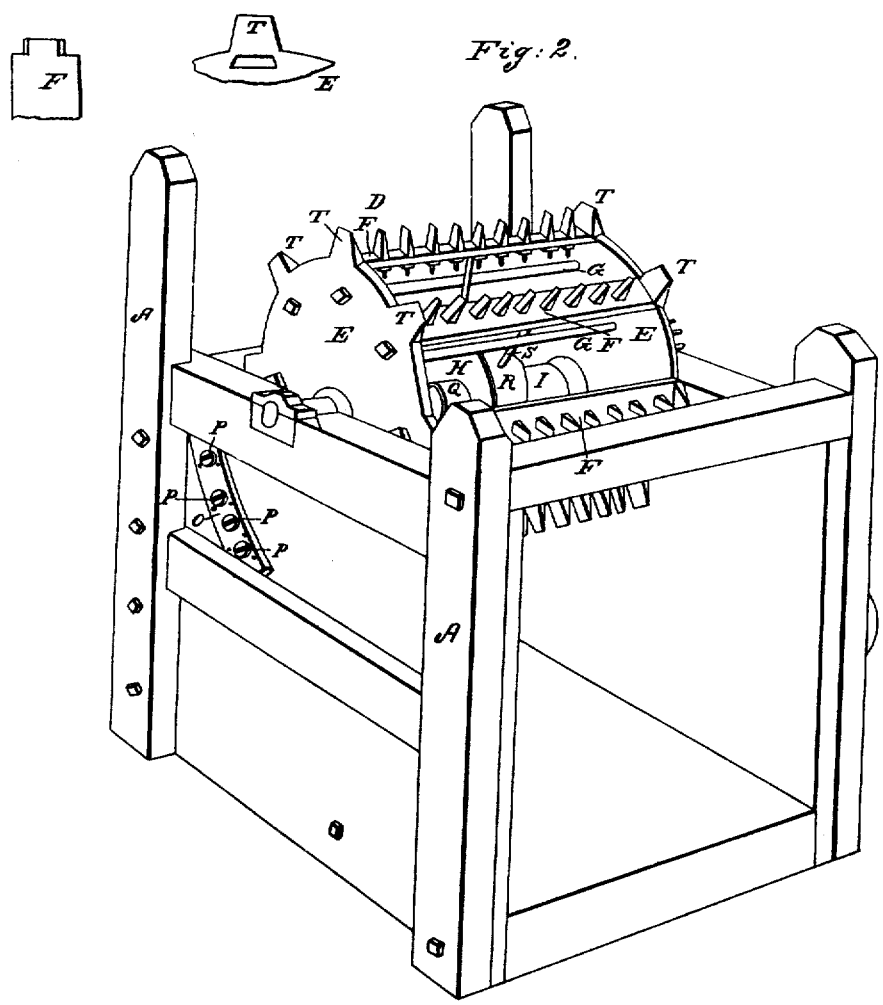

UNITED STATES PATENT OFFICE.

ALEX. W. BOWLING, OF FRONT ROYAL, VIRGINIA.

THRESHING-MACHINE.

Specification of Letters Patent No. 530, dated December 26, 1837.

*To all whom it may concern:*

Be it known that I, ALEXANDER W. BOWLING, of the town of Front Royal, county of Warren, and State of Virginia, have invented certain new and useful Improvements in Machines for Threshing Grain, which is described as follows, reference being had to the annexed drawings of the same, making part of this specification.

The frame A, of this machine is constructed similar to that of some other threshing machines in use, with transverse wrought iron brace bolts to strengthen the same, and having an inclined feeding board B, and cap or cover C, of the usual construction.

Figure 5:
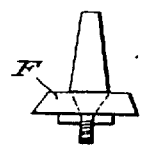

The threshing cylinder D, Figure 2, is composed of two cast iron heads E, E, with wedge shaped teeth T, at their peripheries—said heads being united together by parallel wrought iron bars F Figs. 2 and 5, dovetailed into their inner sides near the circumference thereof as seen at Y, Fig. 8, and held firmly together by round iron rods G, Fig. 2, passing through them below the bars—each rod having a flat head on one end, and a nut on the other.

Figures 6, 7:
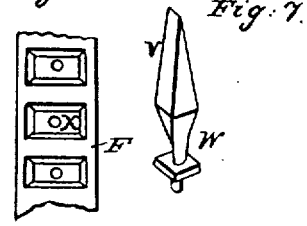

A circular cast iron plate H, Figs. 2 and 6, having an aperture in the center for the axle, with a flange Q, around this aperture on each side; and also a flange or rim R, around the periphery, is placed between the heads with iron rods S, extending from the outer flange or rim R to the bars F, to produce a further support to the same and to prevent said bars flying off by centrifugal force, as the wheel revolves with great velocity, each rod having a flat head countersunk on the outside of the bar, with screw and nut U on the other end, the nut being on the inner side of the outer flange R.

A cylindrical axle I, Fig. 2, turned perfectly true, with suitable journals and collars, passes through the center of the heads E, and flanged plate H, and upon which they are screwed by proper keys, said axle lying horizontally in the frame and turning in suitable boxes of the usual construction, secured on the top thereof. In each bar are secured a number of wrought iron teeth of a wedge shape V, Figs. 2, 5, 7 each tooth having a round shank with a screw cut thereon which is passed through an aperture drilled in the bar and is secured by a nut W, on the inside—the tapered part or base of the tooth being let into a corresponding tapering mortise X Fig. 6, in the outside of the bar, which thus prevents the tooth from turning.

Figure 1:
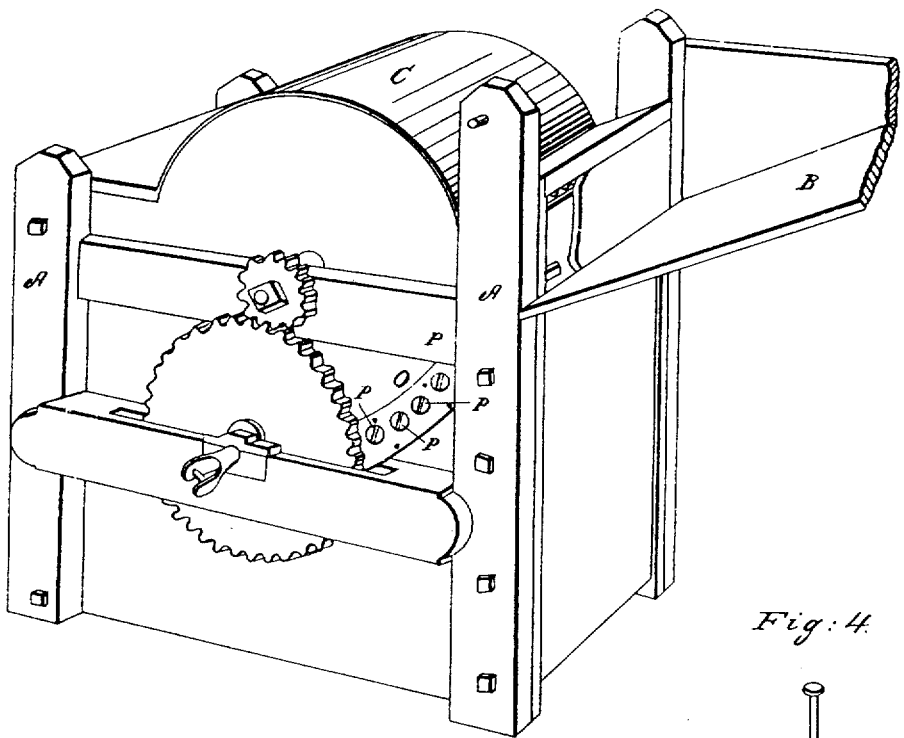
Figure 3:
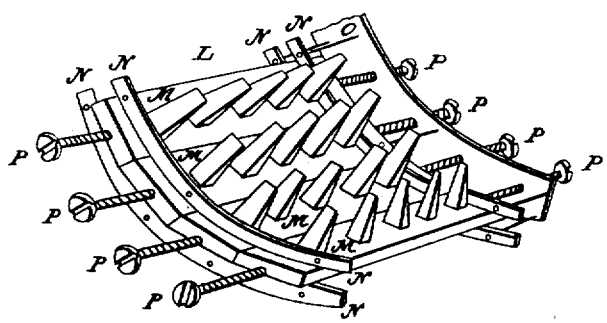
Figure 4:
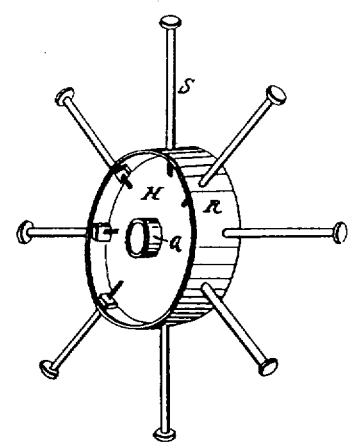

The concave L, Fig. 3, in which the cylinder revolves is composed of a number of flat iron bars M, having teeth similar to those just described, except that the ends of the bars instead of being made dovetailed are made square and are let into channels cut on the inside of the side pieces or boarding of the frame in the segment of a circle, plates of iron N, N, being placed one above and the other below the ends of the bars and fastened to said boarding inside. On the outside of the boarding of the frame and immediately opposite the ends of the bars forming the concave on plates of iron O, O, secured by rivets passing through these plates—the boarding—and through the plates N, N, before mentioned, Figs. 1, 2, and 3. In the outside plates O, are female screws, through which and the boarding containing the channels pass set screws, P, P, P, P, which turn against the ends of the bars for the purpose of setting the teeth in a proper position in relation to the teeth of the cylinder, which is done by receding the screws on one side from, and advancing those on the other side toward the center of the machine—there being two screws to each bar and each bar moving independently of the others.

The gearing of this machine and mode of feeding it are similar to those in common use and therefore need not be here described. The teeth of the cylinder and concave are screwed by letting the shank into an aperture drilled through the bars $\frac{3}{4}$ of an inch in diameter, and its base let into a mortise an $\frac{1}{2}$ by $\frac{3}{4}$ of an inch on the surface of said bars and $\frac{1}{2}$ an inch in depth, running with a taper to the round apertures drilled through said bars, said teeth being made to fit said mortise perfectly, confined by a screw and nut on the inner side of the bars. The object of the taper in the mortises in said bars is to draw the tapering spoke into said mortises which throws the strain in contact between the main body of said spikes and nuts by which the teeth or spikes are kept perfectly secure either from becoming loose, or turning on said bars and are also rendered much stronger at the point where they unite with the bars. See Figs. 5, 6, 7.

The invention claimed by me, the said

Alexander W. Bowling, and which I desire to secure by Letters Patent consists—

1. In the construction of the heads with wedge shaped teeth on the peripheries of the same, the dovetailed mortises on said heads to receive the ends of the bars, in combination with the center flanged plate and rods for securing said bars, the teeth giving strength to the shoulders of the mortises, and the center flange and rods in preventing the bars from bending and coming out of the mortises in the head.

2. Also the manner of constructing the teeth with sloped shoulders and the corresponding cavities in the bars to receive the same.

A. W. BOWLING.

Witnesses:
M. Cloud,
Thos. Monroe.